C. Neumann.
Hoop Skirt. Mach.

No. 50.
1156.

Reissued Mar. 19. 1861.

Witnesses,
Jas. W. Fraser
Geo. Hotkins

Inventor,
Caesar Neumann

UNITED STATES PATENT OFFICE.

CAESAR NEUMANN, OF NEW YORK, N. Y., ASSIGNOR, BY MESNE ASSIGNMENTS, TO HIMSELF.

IMPROVED MACHINE FOR MAKING HOOPED SKIRTS.

Specification forming part of Letters Patent No. 25,163, dated August 16, 1859; Reissue No. 1,155, dated March 19, 1861.

*To all whom it may concern:*

Be it known that I, CAESAR NEUMANN, of the city, county, and State of New York, have invented a new and useful Machine for Manufacturing Hoop-Skirts; and I do hereby declare and ascertain my said invention as follows, referring to the accompanying drawings, in which—

Figure 1:
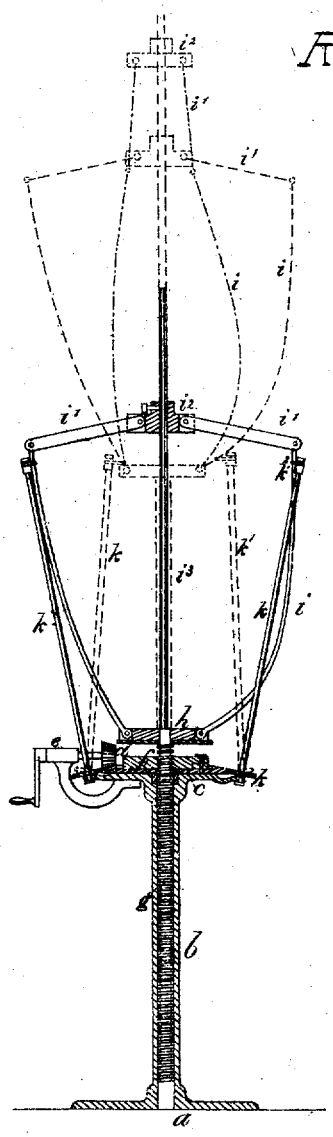
Figure 2:
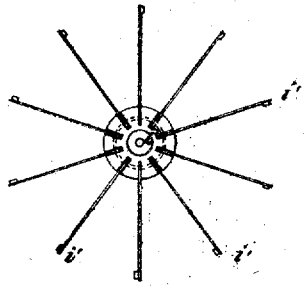
Figure 3:
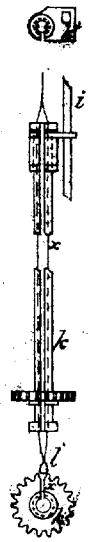
Figure 4:
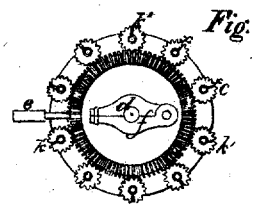
Figure 5:
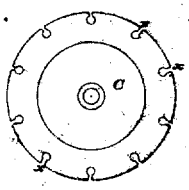

Figure 1 is a vertical section. Fig. 2 is radial rods $i'$; Fig. 3, section of the shaft $k$ enlarged; Fig. 4, plan of gearing; Fig. 5, plan of plate $c$.

My invention is for manufacturing the skirt by machinery, the mode that I have devised for constructing the skirt enabling me to employ machinery therein.

A variety of modifications of frame-work and other parts of the machine and its mode of operation may be made, as will be evident in perusing the description, without departing from the principal features required; but I will describe and illustrate the form I have illustrated in the drawings, which will clearly show the type of the invention.

I construct a strand with a base, $a$, and single upright $b$, for the purpose of conveniently working all around the skirt. The upright standard $b$ is a hollow tube, and it bears on its top a circular flat plate, $c$, above which, and close to the said plate $c$, there is a bevel-wheel, $d$, that is turned by a pinion, $e$, driven by a hand-crank or otherwise. The wheel $d$ is concentric with the plate $c$, and its hub is hollow, as clearly seen in Fig. 1, the exterior being projected downward into a recess in plate $c$, by which it is steadied while turning. Upon the bevel-wheel $d$, I attach a divided nut, $f$, that is made to embrace and fit a screw, $g$, which passes perpendicularly down through the center of the bevel-wheel and hollow standard $b$. By turning the bevel-wheel and nut the screw is raised for purposes hereinafter to be described. On the top of the screw there is a small circular plate, $h$, into the edges of which are jointed a sufficient number of curved guide-rods $i$, as will hereinafter appear. These guide-rods are curved to the outline of the skirt to be made, and their upper ends are jointed to radial rods $i'$, that extend out from a hub, $i^2$, to which they are also jointed, as clearly appears in Figs. 1 and 2. The hub fits to a perpendicular rod, $i^3$, projecting up from plate $h$ when fixed, as in Fig. 1. The curved rods $i$ and radial arms $i'$ determine the size of the skirt to be made, which may be larger or smaller, by the position fixed for hub $i^2$. Around the edge of the plate $c$, affixed to the main standard $b$, there are lower bearings of a series of twisting-rods or long shafts, $k$, as many in number as there are curved guide-rods $i'$. The shafts may be hollow, as shown in the enlarged sectional Fig. 3, or they may be solid rods. At the lower end of each rod there is a pinion, $k'$, affixed, which gears into spur-gearing cut on the edge of bevel-wheel $d$, by which means the whole series of twisting-rods are revolved. This is shown in plan in Fig. 4. (It is obvious that a band, instead of gearing, could be used, but it is not so certain or exact.) When the screw is down in the position as in Fig. 1, the shafts $k$ extend nearly to the top of the curved guide-rods $i$, and at their upper ends there is a little guide-plate, $k^2$, (seen in plan at the top of Fig. 3). This has a hole through it that fits the guide-rod $i$, that is made to slide up through it by the elevating-screw $g$. This guide-plate serves as a bearing for the upper end of the shaft $k$ to turn in, and guides it to the shape of the skirt to be made. At or near the junction of each of the curved guides $i$ with the radial rods $i'$ there is a hook or its equivalent, in which the loop or bight of a twisted strand is caught, and it is then brought into the center of rotation of the shaft $k$, there being a slot through its side from top to bottom for the purpose, and also through its bearings, as seen at $x$ $x$ $x$ in Figs. 3, 4, and 5. At the bottom this strand, which is double its whole length, is tied together, and a small weight, $z$, is tied to it, as seen in Fig. 3, where the red line represents the cord. At the top the cord is separated either by two hooks, by a center-piece on each side of which the two strands lay, as seen in the figure, or by any other convenient means.

The operation of manufacturing a skirt upon this machine is as follows: A double strand is attached to each guide-rod hook and passed down along each of shafts $k$, there being as many cords as shafts, or as the manufacturer desires to put in the skirt; and instead of one double strand, two or more may be inserted. The number of guide-rods will determine the distance apart the suspendingcords are to be. When the strands are inserted and the parts in the position as seen in Fig. 1, a hoop is inserted into a bight of all the strands, running horizontally entirely around, the diameter of the skirt being the size determined by the spread of the guide-rods *i* by the extension-rods *i'*, which expands or contracts the twisting-apparatus so that any size may be made on the same machine. The pinion *e* and wheel *d*, being then turned cause, the shafts *k* and their pinions to revolve, and thus back-twist the two strands of the cord together below the hoop, and inclose and fasten it at the same time. The nut turns around the screw *g*, and elevates the guide-rods, &c., carrying up the hoop with it. When a sufficient length of twist is made for the distance between the hoops, a second hoop is inserted, and the twisting and elevation proceed until the hoops are inserted. For a full-sized hoop-skirt this would bring the form up to the position shown by red line in Fig. 1, the twisting-shafts at the same time being drawn inward to the smallest size of the skirt, (also indicated by red lines.) The hub $i^2$ is then released from the center rod, $i^3$, slid up, and the guide-rods collapsed as indicated by blue lines, and the skirt is removed. The divided nut *f* is opened and the screw and guide rods, with their appendages, fall to the position as at the commencement, ready to make a second skirt.

In this machine the skirt is made upside down, but the guides may be reversed, so, instead of hollow shafts *i*, they may be made solid, and, instead of the guide-rods and a plate with radial slots in it, may contain and guide the twisting apparatus; but these and numerous other changes are but merely incidentals of construction to suit the requirements of the workers, and are but mechanical varieties in no way changing the principles of the machines.

Having thus fully described my machine for making hoop-skirts, what I claim therein as new, and for which I desire to secure Letters Patent, is—

1. The combination of a series of twisting apparatus, for the purpose of forming a hoop-skirt, substantially as and for the purposes set forth.

2. In combination with the twisting apparatus, the elevating-screw and its appendages, and the mode of operating the same, as described.

3. The guide-rods *i*, for guiding the twisting apparatus and determining the size and shape of the skirt, as set forth.

4. Collapsing the guides to form different-sized skirts and to deliver the same as specified.

5. Moving the guides up and down to determine the position of the twisting apparatus.

6. Simultaneously twisting a series of cords for the purpose of forming a hoop-skirt, substantially as herein described.

CAESAR NEUMANN.

Witnesses:

JULIUS HENIUS,
JAMES F. RUGGLES.